United States Patent [19]
> Butler

[11] 3,828,945

[45] Aug. 13, 1974

[54] REMOTE CONTROL MECHANISM FOR A BALE UNLOADING WAGON

[75] Inventor: Gene R. Butler, Kingsburg, Calif.

[73] Assignee: Sperry Rand Corporation, New Holland, Pa.

[22] Filed: Sept. 4, 1973

[21] Appl. No.: 393,878

[52] U.S. Cl............... 214/8.5 R, 214/6 B, 214/518
[51] Int. Cl.............................................. B65g 60/00
[58] Field of Search............ 214/6 B, 8.5 R, 8.5 A, 214/8.5 G, 8.5 H, 518, 519

[56] References Cited
UNITED STATES PATENTS

| | | | |
|---|---|---|---|
| 3,487,955 | 1/1970 | Brown................................ | 214/6 B |
| 3,502,230 | 3/1970 | Grey et al. ......................... | 214/6 B |
| 3,754,668 | 8/1973 | Butler.............................. | 214/8.5 G |

Primary Examiner—Frank E. Werner
Attorney, Agent, or Firm—Frank A. Seemar; John R. Flanagan; Louis J. Virelli, Jr.

[57] ABSTRACT

A remote control mechanism is provided which may be utilized by the operator of a bale wagon to control the operation of a bale unloading means while the operator is at a location remote from the wagon, such as in a hay mow of a barn or on the top of a stack of bales. Heretofore, in order to control the bale unloading operation, the operator must have been located at the side of the wagon in order to directly move a lever for actuating the bale unloading means or located at the front of the wagon in order to pull forwardly on a control rod which moves the lever by pulling forwardly a control cable being attached at one end to the lever and at the opposite end to the control rod. The mechanism includes a rope or the like secured at one end to an intermediate portion of the control cable and being of a length capable of reaching to the operator at the location remote from the wagon, and a pair of guide tabs each of which are secured to a chassis of the wagon respectively adjacent one of the opposing ends of the intermediate portion of the control cable and through each of which runs the control cable. The one of the tabs nearer to the location of the lever confines one end portion of the control cable, respectively extending from one of the opposing ends of the intermediate portion of the cable to the one end of the cable, to movement in the aforementioned forwardly direction when the rope is pulled in a direction lateral to the forwardly direction of the cable which pulls the intermediate portion in the same lateral direction. The other of the tabs nearer to the control rod of the wagon restricts the other end portion of the cable, respectively extending from the other of the opposing ends of the intermediate portion of the cable to the opposite end of the cable, from movement in the aforementioned lateral direction when the rope is pulled in the lateral direction which pulls the intermediate portion of the cable in the same lateral direction and thereby pulls the one end portion of the cable in the forwardly direction and moves the lever. Preferably, a loop is clamped in the intermediate portion of the control cable to which is fastened a releasable latch on the one end of the rope whereby when the operator completes the unloading operation the rope may be released from its securement with the loop of the control cable.

8 Claims, 8 Drawing Figures

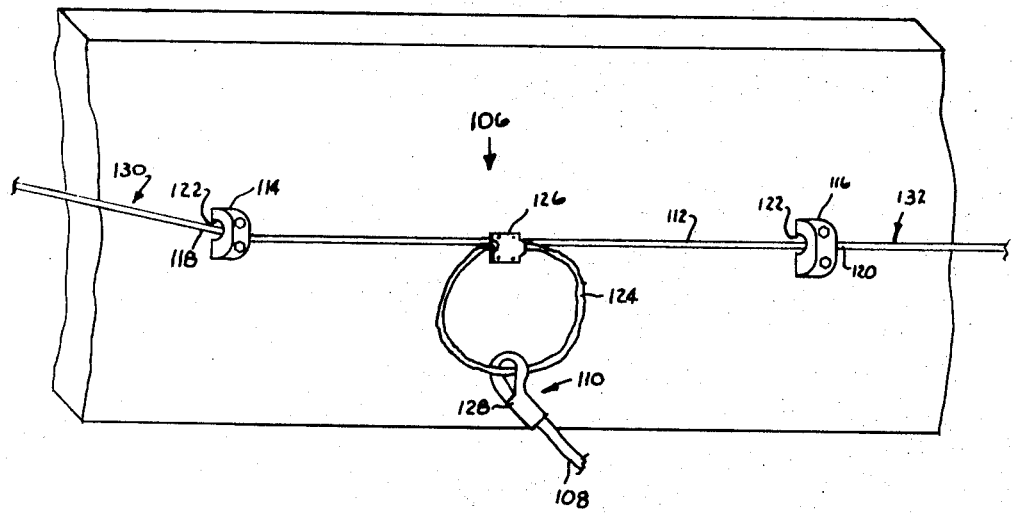
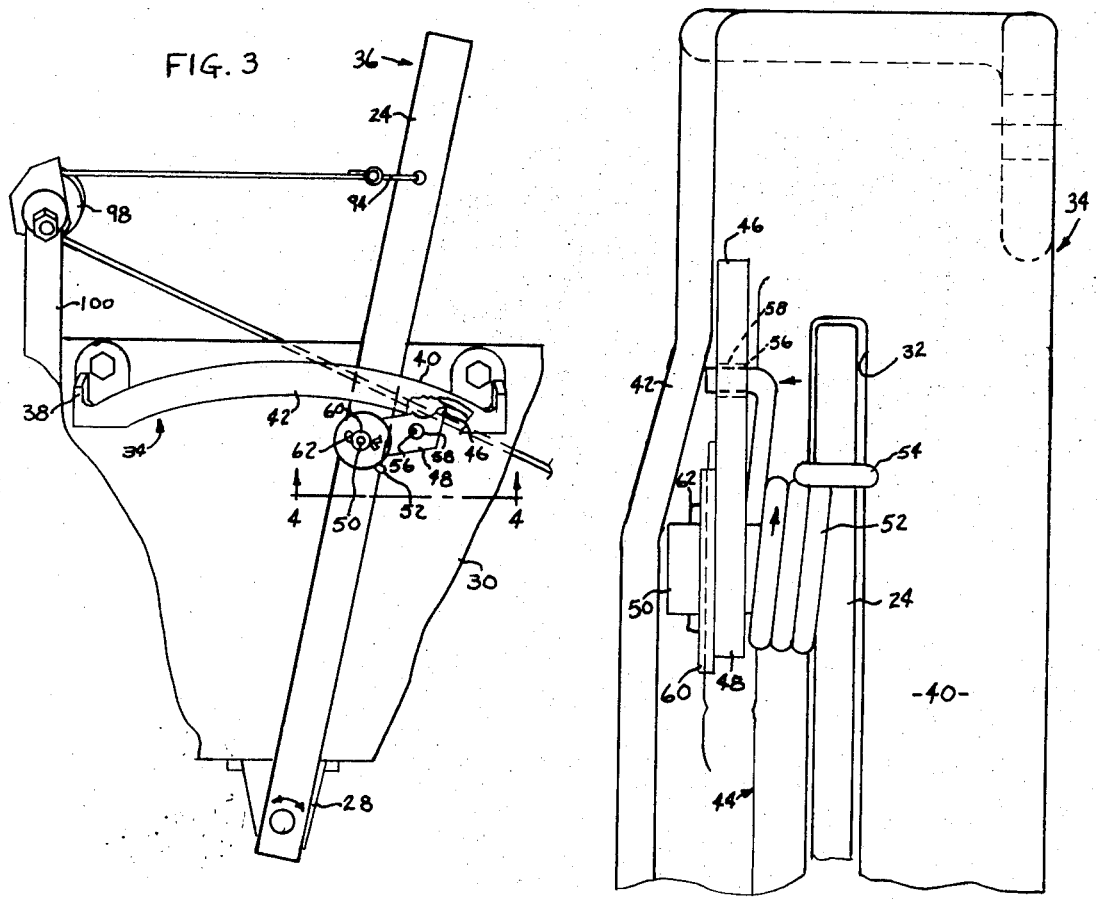

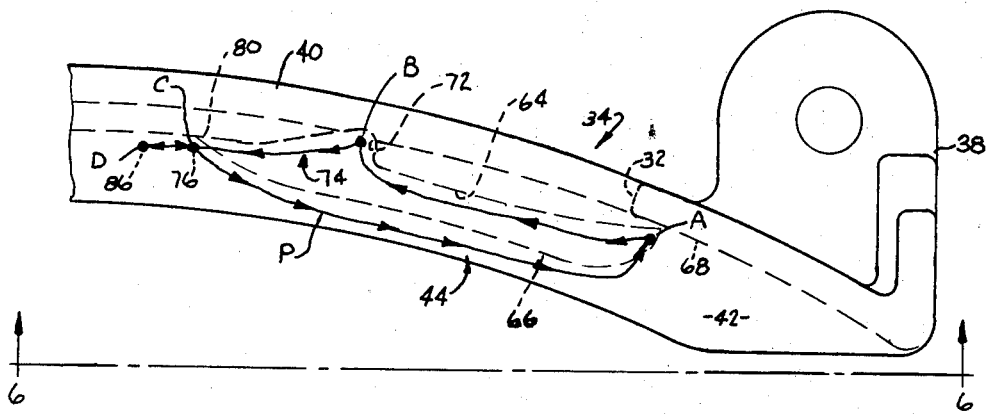
FIG. 5
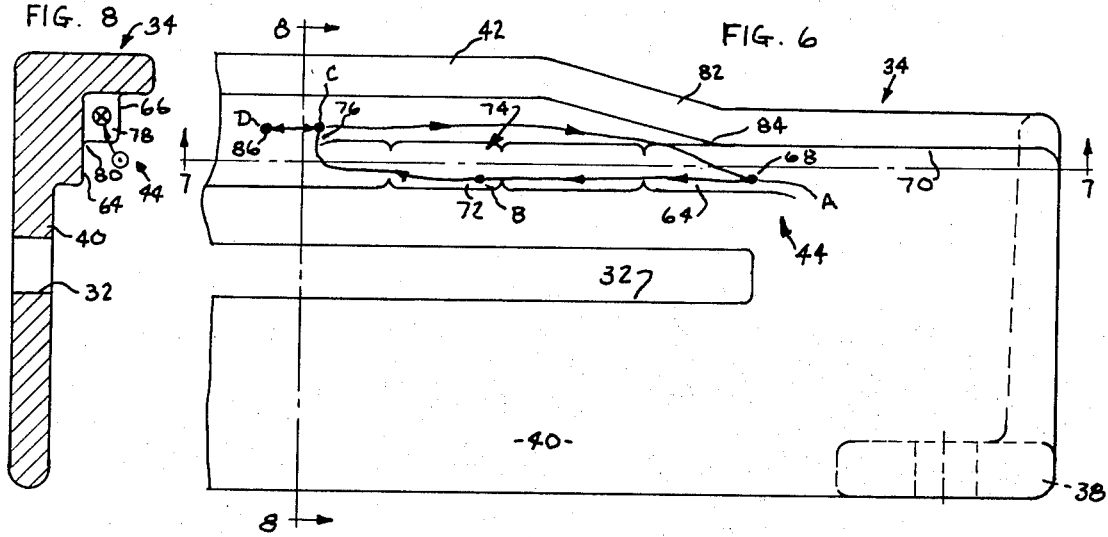
FIG. 8
FIG. 6
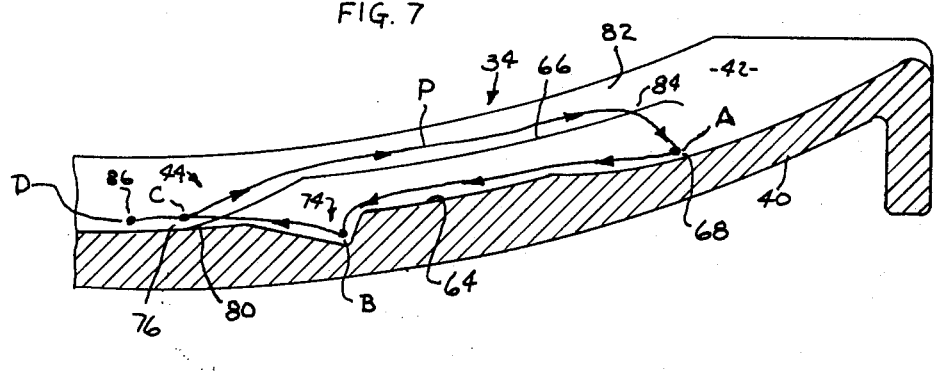
FIG. 7

REMOTE CONTROL MECHANISM FOR A BALE UNLOADING WAGON

BACKGROUND OF THE INVENTION

1. Field of the Invention

The present invention relates generally to bale wagons or vehicles intended to handle baled products such as baled hay and more particularly to a bale wagon having a bale unloading means and a mechanism for remotely controlling the operation of the bale unloading means whereby the unloading can be controlled from a location remote from the wagon such as a hay mow of a barn or the like.

2. Background of the Prior Art

A bale wagon capable of unloading bales one at a time, such as into a bale elevator, has recently been introduced to the trade, such wagon being disclosed also in U.S. Pat. No. 3,502,230. This bale wagon is provided with a movable lever adjacent to the unloading station of the wagon for controlling the discharge of bales one at a time from the wagon by directly moving the lever at the side of the wagon. Also, the unloading operation may be controlled at the front of the wagon by pulling forwardly on a control rod located at the forward end of the wagon which moves the lever by pulling forwardly a control cable being attached at one end to the lever and at the opposite end to the control rod.

It has been found in practice, however, that in many cases it is desirable to control the unloading operation from other locations than at a position adjacent to the lever or to the front end of the wagon. Such other locations are, for example, a hay mow of a barn, or on the top of a stack of bales, to which the bales are being conveyed by an elevator. With respect to these locations, remote control of the unloading operation is particularly desirable since the operator of the bale wagon frequently will find it necessary to be in the hay mow of the barn or on top of the stack to assist in the storage of the bales as the bales are conveyed thereto by the elevator.

OBJECTS AND SUMMARY OF THE INVENTION

It is an object of the present invention, therefore, to provide a remote control mechanism for a bale unloading operation of a bale wagon of the type disclosed in U.S. Pat. No. 3,502,230 which will permit the operator of the bale wagon to control the unloading operation from locations remote from the wagon.

It is another object of the present invention to provide a remote control mechanism which is simple and inexpensive to install on bale wagons of the aforementioned type.

A further object of the present invention is to provide a remote control mechanism which will be effective to control the unloading operation from remote locations at a wide range of angle to the bale wagon.

The above objects, and others which will be apparent to those skilled in the art, are accomplished by providing a mechanism which includes a rope, or the like, secured at one end to an intermediate portion of the control cable on the wagon and being of a length capable of reaching to the operator at the desired location remote from the wagon, and a pair of guide tabs each of which are secured to a chassis of the wagon respectively adjacent one of the opposing ends of the intermediate portion of the control cable and through each of which runs the control cable. The one of the tabs nearer to the location of the lever confines one end portion of the control cable, respectively extending from one of the opposing ends of the intermediate portion of the cable to the one end of the cable, to movement in the aforementioned forwardly direction when the rope is pulled in a direction lateral to the forwardly direction of the cable which pulls the intermediate portion in the same lateral direction. The other of the tabs nearer to the control rod of the wagon restricts the other end portion of the cable, respectively extending from the other of the opposing ends of the intermediate portion of the cable to the opposite end of the cable, from movement in the aforementioned lateral direction when the rope is pulled in the lateral direction which pulls the intermediate portion of the cable in the same lateral direction and thereby pulls the one end portion of the cable in the forwardly direction and moves the lever.

Preferably, a loop is clamped in the intermediate portion of the control cable to which is fastened a releasable latch on the one end of the rope whereby when the operator completes the unloading operation the rope may be released from its securement with the loop of the control cable.

Other objects and attainments of the invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

BRIEF DESCRIPTION OF THE DRAWINGS

In the course of the following detailed description reference will be frequently made to the attached drawings in which:

FIG. 2 is an enlarged perspective view of the remote control mechanism shown in FIG. 1;

FIG. 3 is an enlarged fragmentary front elevational view of the movable level shown in FIG. 1, for controlling the unloading operation of the bale wagon;

FIG. 4 is an enlarged fragmentary view of the movable lever and a pawl coupled thereto, shown in FIGS. 1 and 3, as seen along line 4—4 of FIG. 3;

FIG. 5 is an enlarged fragmentary front elevational view of approximately the right half of a quadrant shown in FIGS. 1 and 2;

FIG. 6 is a bottom plan view of the quadrant of FIG. 5 as seen along line 6—6 of FIG. 5;

FIG. 7 is a sectional view of the quadrant of FIG. 6 as seen along line 7—7 of FIG. 6; and FIG. 8 is another sectional view of the quadrant of FIG. 6 as taken along line 8—8 of FIG. 6.

DETAILED DESCRIPTION OF THE INVENTION IN GENERAL

Figure 1:
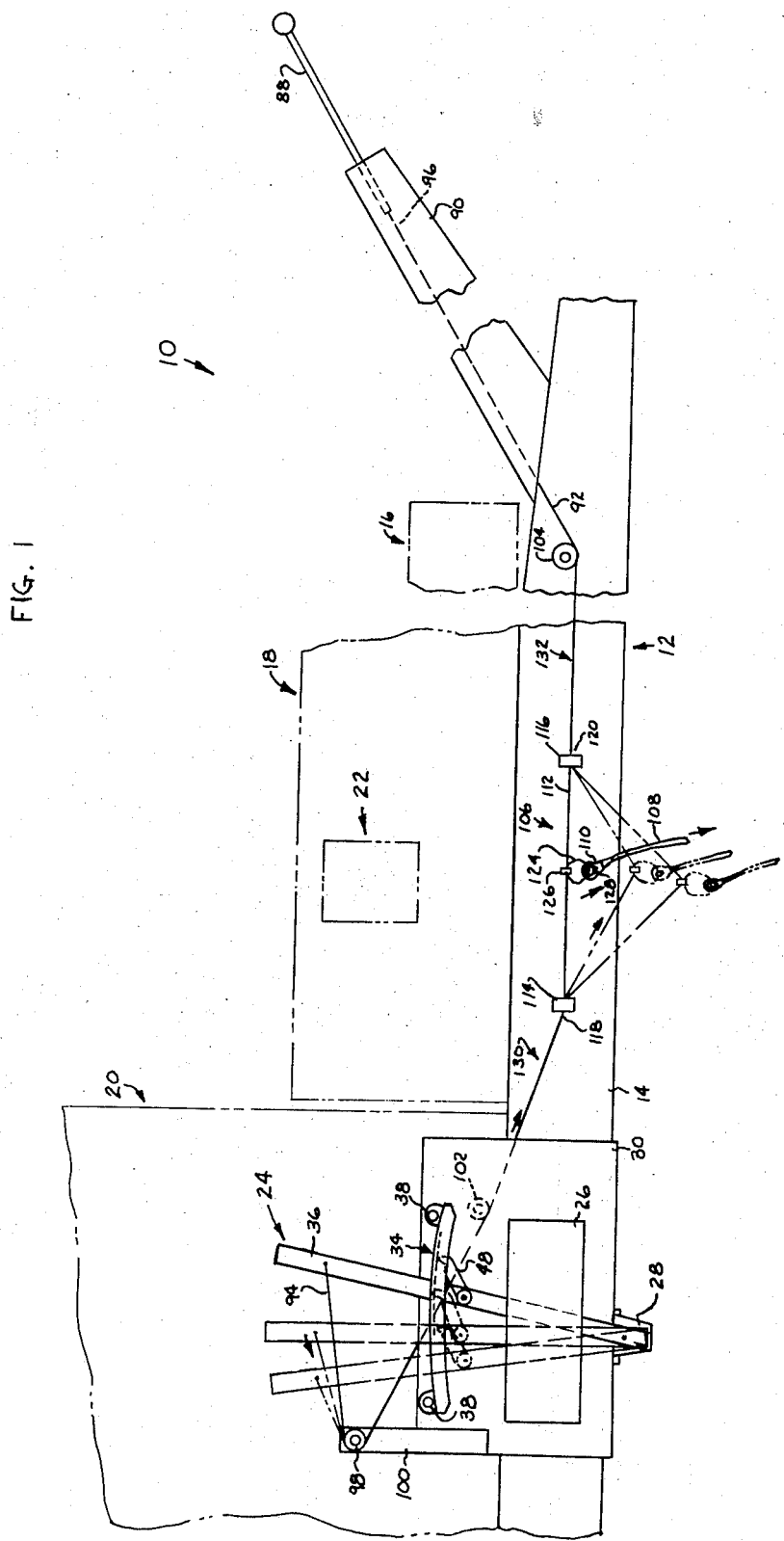
FIG. 1 is a fragmentary side elevational view of a bale wagon of the type disclosed in U.S. Pat. No. 3,502,230 incorporating a remote control mechanism constructed in accordance with the principles of the present invention.

Referring to the drawings and particularly to FIG. 1, there is shown a fragmentary portion of an improved bale wagon, indicated generally by numeral 10, being of the general type disclosed in U.S. Pat. No. 3,502,230.

The bale wagon 10 is provided with a chassis, indicated generally by numeral 12, a fragmentary portion of which is only shown in FIG. 1. The chassis 12 is formed of left and right longitudinally extending rails 14 of which only the right rail 14 is shown and cross rails (not shown) which interconnect the longitudinally extending rails 14 at their rearward portions. Although not specifically shown the rearward portions of the rails 14 are supported by a pair of wheels and the forward portions of the rails 14 converge together and merge into a clevis assembly which adapts the wagon 10 to be secured to a tractor, or other towing vehicle, located at the front thereof.

Mounted at the forward portion of the chassis 12 and extending transversely thereto for pivotal movement between a lower, horizontal bale-receiving position and an upper, vertical, bale-discharge position is a first or bale-receiving table, being schematically shown in FIG. 1 and generally indicated by the numeral 16. A bale loader, although not shown, is mounted on the left side of the forward portion of the chassis 12 adjacent to the left end of the first table 16 and is adapted to elevate bales from the ground and laterally deflect them onto the first table 16 at its left end. A conveyor, also not shown, is mounted on the left longitudinal rail of the chassis 12 below the first table 16 and is adapted to assist the bale loader in positioning the bales upon the first table 16. The first table 16 is capable of receiving a predetermined number of bales, preferably two bales, successively at a given time from the bale loader. After receiving the two bales, the first table 16 is then capable of being pivotally moved to its bale-discharge position to discharge the bales onto a second or tier-forming table, being schematically shown in FIG. 1 and generally indicated by the numeral 18. The second table 18, being pivotally mounted on the chassis 12 and disposed generally co-planarly with, and rearwardly and upwardly from, the first table 16, accumulates rows of bales transferred thereto by the first table 16 and forms them into tiers. Mounted on the chassis 12 to the rear of the second table 18 is a third table or load rack, being schematically shown in FIG. 1 and generally indicated by the numeral 20, to which is transferred each of the tiers of bales formed on the second table 18 by pivotally moving the second table 18 to a vertical position. A rolling rack, not shown, supports the tiers of bales as they are placed in a vertical position on the load rack 20 and generally moves toward the rearward end of the wagon 10 as successive tiers of bales are received on the load rack 20.

The rolling rack may also be operated in a reverse manner after a stack of bales, as formed by a plurality of tiers, have been received on the load rack 20 when it is desired to unload the bales one at a time from the wagon 10. The rolling rack advances the stack forwardly a tier at a time to allow one tier of bales to fall on the second table 18 after the table 18 has been placed in its inclined bale unloading position intermediately between its horizontal and vertical positions. A cross conveyor, being schematically shown in FIG. 1 and generally indicated by the numeral 22, is mounted on the second table 18 and adapted to discharge bales to the right side of the wagon into an elevator, not shown, one at a time from the bottom layer of the tier on the second table 18 simultaneously as bale engaging means such as bale hooks, not shown, being mounted on the second table 18 engage a layer of bales above the bottom layer to prevent interference with the bottom layer of bales being discharged.

The bale loader, the bale conveyor, the first, second and third tables 16, 18 and 20, the rolling rack, the cross conveyor 22, the bale engaging means and other known features of the bale wagon 10 are operated by various hydraulic and mechanical devices. The specific details of the construction and operation of the aforementioned features and of the various hydraulic and mechanical means utilized to operate them need not be described in this application in order to properly understand the present invention. The disclosure of U.S. Pat. No. 3,502,230 provides an adequate detailed description of these features and is incorporated herein by reference thereto. The specific details of the construction and operation of a movable control lever, generally indicated as numeral 24, are described in detail hereinafter in order to promote a thorough understanding of the present invention upon a reading of this application alone. However, the cooperation of the lever 24 with certain of the aforementioned hydraulic units which control the operation of the rolling rack and the cross conveyor 22, which cooperation occurs in the area represented by block 26, need not be described in detail in this application in order to properly understand the present invention. The disclosure of the aforementioned U.S. patent also provides an adequate detailed description in this respect and is incorporated herein by reference thereto.

COOPERATION OF CONTROL LEVER AND ITS PAWL WITH QUADRANT

The movable control lever 24 is provided on the right side of the wagon 10 for controlling the operation of the rolling rack and the cross conveyor 22 in the bale unloading operation described hereinabove, via respective hydraulic units as represented by block 26 and being substantially the same as those units described and schematically illustrated in the aforementioned U.S. Patent.

Referring to FIG. 1 and more particularly to FIG. 3, the control lever 24 is shown pivotally mounted on a bracket 28 which is fixed to the bottom of a right-angled support plate 30 which, in turn, is fixed to the bottom of the right longitudinally extending rail 14 of the chassis 12 at a location adjacent to the forward end of the load rack 20 and adjacent to, and rearwardly of, the rearward end of the second table of the bale wagon 10. The lever 24 extends upwardly along the support plate 30, through a slot 32 defined in a quadrant, generally indicated by numeral 34, to a handle end portion, indicated by numeral 36, at the free top end of the lever 24.

The quadrant 34 includes a pair of vertically extending end flanges 38 by which the quadrant 34 is fixedly mounted adjacent the upper end of the support plate 30. The flanges 38 are integrally formed with opposing ends of an arcuate, upwardly-bowed top plate 40 and an arcuate, upwardly-bowed front plate 42 which also is integrally formed with the end flanges 38 and is integrally formed with the top plate 38 along its front side and extends downwardly therefrom. The underside of the top plate 40 has a pattern of groove tracks, generally indicated by numeral 44 and more specifically shown in FIGS. 5 – 8, formed therein and against which is engaged a tip 46 of a pawl 48 being carried by the lever 24 in a manner to be described hereinbelow.

Referring now to FIG. 4, the pawl 48 is shown pivotally mounted about a lug 50 which protrudes from the lever 24 about midway along its length and just below the quadrant 34. A biasing spring 52 is also mounted about the lug 50 between the pawl 48 and the lever 24. The spring 52 has one end 54 hooking around and embracing a side of the lever 24 and an opposite end 56 projecting through an aperture 58 in the pawl 48. Being in such position between the pawl 48 and the lever 24, the spring 52 is resiliently deformed from its natural configuration such that the spring 52, by trying to return to its natural configuration, biases the pawl 48 via the opposite end 56 of the spring 52 both in a direction outwardly from the lever 24 and toward the front plate 42 of the quadrant 34 and into pressurized contact with a washer 60 inserted on the end of the lug 50 between the pawl 48 and a cotter key 62 which retains the pawl 48 on the lug 50 and in a direction counterclockwise about the lug 48 toward the underside of the top plate 40 of the quadrant 34 whereby the tip 46 of the pawl 48 is constantly being forced by the spring 52 both toward the underside of the top plate 40, and thereby maintained in pressurized contact therewith by the deformed spring 52, and toward the front plate 42 of the quadrant and away from the lever 24.

Referring now to FIGS. 5 – 8, there is shown the pattern of groove tracks 44 on the underside of the top plate 40 of the quadrant 34 as seen at a variety of angles to the quadrant 34 which views are presented for the purposes of promoting a clear understanding of the path P traveled by the tip 46 of the pawl 48 when moving the lever 24 from its solid line neutral or off position of FIG. 1 to the left to its broken line intermediate rear position, then the the left some more to its broken line extreme rear position and finally back to its neutral solid line position. It should be noted here that the lever 24 is biased to normally assume its neutral position of FIG. 1 whenever the lever is moved in either direction from that position. Although not shown, any suitable means may be utilized for biasing the lever in this manner, such as the spring arrangement schematically disclosed in FIG. 9 of the aforementioned U.S. patent. It should also be noted at this point that the solid line neutral position, the broken line intermediate rear position, and the broken line extreme rear position of the lever 24 of FIG. 1 respectively correspond to the vertical position, the number 2 position, and the number 1 position of the lever 546 in FIG. 9 of the aforementioned U.S. patent. Further, the hydraulic functions respectively performed by the hydraulic units represented by block 26 when lever 24 is at its aforementioned positions are substantially the same as those performed by the hydraulic units illustrated in FIG. 9 of the aforementioned U.S. patent when lever 546 associated therewith is at its corresponding positions. Therefore, as mentioned hereinbefore, the cooperation which occurs between the lever 24 and the hydraulic units represented by block 26 of FIG. 1 need not be described in detail herein since such specific details are not necessary for a proper understanding of the present invention and also since an adequate detailed description in this respect is contained in the aforementioned U.S. patent. For present purposes, it will suffice in the following description of the path traveled by the pawl tip 46 along the groove tracks 44, as the lever 24 is moved between its aforementioned positions, to point out the relationship between the respective positions of the lever 24 and the operation of the rolling rack and of the cross conveyor 22 in the unloading operation or, in other words, to point out what an operator may reasonably expect to achieve in terms of controlling the bale unloading operation by moving the lever 24 to a particular one of the positions.

The pattern of groove tracks 44 includes an upper track 64 and a lower track 66. In general, the upper track defines the portion of the path P along which the pawl tip 46 must travel and be positioned for operating either the rolling rack or the cross conveyor 22 of the wagon 10, while the lower track 66 defines the portion of the path P along which the pawl must travel in order to be able to reset itself for a succeeding trip along the lower track 64.

More specifically, in a first region 68 of the upper track 64 at a point where the pawl tip 46 will be approximately located, being indicated as letter A, when the lever 24 is in its solid line neutral position of FIG. 1, the track 64 is contiguous to an interior wall surface 70 of the front plate 42, as clearly shown in FIG. 6. Recalling that the pawl 48 is biased both in the direction toward the underside of the top plate 40 and in the direction toward the interior wall surface 70 of the front plate 42, the first region 68 and the interior wall surface 70 together confine the pawl tip 46 at point A within the quadrant 34. When the lever 24 is in its neutral position with the pawl tip 46 approximately at point A, neither the rolling rack nor the cross conveyor are operated, therefore the bale unloading operation is in a condition of arrest.

In a second region 72 of the upper track 64 at a point where the pawl tip 46 will be approximately located, being indicated as letter B, when the lever 24 is in its broken line intermediate rear position of FIG. 1, the track 64, which has a detent formed therein, generally indicated as numeral 74, with the pawl tip 46 extending therein, is now spaced from the interior wall surface 70 of the front plate 42 with the lower track 66 being now interposed therebetween. The detent 74, by its engagement with the pawl tip 46 and in view of the biases being imposed on the pawl tip 46 by the spring 52, will retain the lever 24, via the pawl 48, in its intermediate rear position, without any external assistance, against the bias of the lever 24 which attempts to force its return back to its neutral position. When the lever 24 is in its broken line intermediate rear position with the pawl tip 46 at point B, the rolling rack does not operate to deliver a tier of bales to the second table 18, but rather, the cross conveyor 22 does operate to unload bales one at a time as described hereinbefore.

In a third region 76 of the upper track 64 at a point where the pawl tip 46 is approximately located, being indicated as letter C, when the lever 24 has moved rearwardly from its broken line intermediate rear position of FIG. 1 but has not yet been moved still further rearwardly to its broken line extreme rear position of FIG. 1 such that the lever 24 is held by the assistance of external means against its bias at what may be referred to as a transition position, the track 64 converges in a side-by-side fashion with an ascending portion 78 of the lower track 66 whereby the tracks 64,66 form a single surface which is contiguous with the interior wall surface 70 of the front plate 42 and begins at a line indicated as numeral 80. Upon reaching line 80 of the transition position, the pawl tip 46, in view of the biases being imposed thereon by the spring 52, will automatically align with what has been previously referred to as the ascending portion 78 of the lower track 66. Such aligning is shown in FIG. 8 wherein the point surrounded by a circle represents the pawl tip 46 along its path coming out of the sheet and the cross surrounded by a circle represents the pawl tip 46 along its path going into the sheet. With the lever 24 being held at this transition position, two alternatives are open to the operator. First, the lever 24 may be released and, in view of the bias being imposed thereon, will automatically return to its neutral position and with the pawl tip 46 making the return trip engaged with the lower track 66 until reaching the end of portion 82 of the interior wall surface 70 of the front plate 42 which converges into the aforementioned contiguous relationship with the upper track 64 at which point, indicated as numeral 84, the pawl tip 46 ascends into engagement with the upper track 64 approximately at point A. Second, the lever 24 may be further rearwardly moved to its broken line extreme rear position of FIG. 1 and held thereby the assistance of external means whereby the pawl tip 46 will be located in a fourth region 86 of the now converged upper and lower tracks 64,66 at a point D. When the lever 24 is in its broken line extreme rear position with the pawl tip at point D, the cross conveyor 22 does not operate, but rather, the rolling rack does operate to advance a tier of bales onto the second table 18. After the one tier has been advanced and fallen onto the second table 18, the lever 24 is immediately released, arresting the forward movement of the rolling rack, and automatically returns to its neutral position with the pawl tip 46 traveling back along the lower track 66 as described hereinbefore in connection with the aforementioned first alternative.

It is readily seen that the first aforementioned alternative would be selected if the operator desired to arrest the unloading operation for any reason prior to the completion of the unloading of all of the bales in the one tier on the second table 18. The second aforementioned alternative would be selected if the operator desires to advance another tier of bales to the second table 18 after completion of the unloading of all of the bales in the preceeding one tier from the second table so that the second table 18 is now empty.

CONTROL ROD AND CABLE

Heretofore, in order to control the bale unloading operation, the operator must have been either located at the side of the wagon 10 in order to directly grip the lever 24 and move it between its various aforementioned positions in the manner described hereinabove or located at the front of the wagon 10 in order to grip a control rod 88, being slideably mounted on an inclined support post 90 extending forwardly at the front end of the wagon 10, and pull it forwardly to move the lever 24 between its various aforementioned positions in the manner described hereinabove.

The control rod 88 is coupled to the lever 24 by a control cable 92 being attached at its one end 94 to the handle end portion 36 of the lever 24 and at its opposite end 96 to the control rod 88. The control cable 92 is strung between the lever 24 and the control rod 88 and attached thereto so as to be under a condition of slight tension wherein very little slack exists in the cable 92. As seen in FIG. 1, the cable 92 is disposed near its one end 94 about a first pulley 98 being mounted by an upstanding brace 100 mounted on the support plate 30 above and rearwardly of the quadrant 34 and rearwardly of the lever 24. The cable 92 is further disposed about a second pulley 102 mounted on the back of the support plate 30 and a third pulley 104 mounted on the right longitudinally extending rail 14 near the lower end of the inclined support post 90.

Therefore, it is readily apparent that because of its disposition about the first pulley 98 being mounted directly rearwardly of the handle end portion 36 of the lever 24, the cable 92, when pulled forwardly by pulling on the control rod 88 or released by releasing the control rod 88 will respectively pull the lever 24 rearwardly or release the lever 24 whereby the lever 24 may be moved between its aforementioned positions in the manner described hereinabove since to move the lever from its neutral position to its intermediate rear position and then to its extreme rear position force need only be applied in a rearward direction to overcome the bias of the lever 24 toward its neutral position. Upon release of the application of that force, the lever 24 automatically returns to its neutral position in the manner described hereinabove.

REMOTE CONTROL MECHANISM

Referring to FIG. 1 and more particularly to FIG. 2, a remote control mechanism, generally indicated as numeral 106, is shown which allows the operator, as mentioned hereinbefore, while at a location remote from the wagon 10 to be able to control the operations of the rolling rack and the cross conveyor 22 in unloading bales from the wagon. While the mechanism 106 is relatively simple, as will become apparent from the description thereof which will follow, the utility of the bale wagon 10 is significantly improved and enhanced by the incorporation of the mechanism 106 is the wagon 10 since it releases the operator from having to supervise the unloading operation from a location adjacent to the wagon 10 and thereby results in a reduction in total manpower required to handle the bales since the operator alone can handle the storage of bales simultaneously as they are being unloaded or assist others in doing so while still retaining the ability to control the unloading operation instantaneously in case an emergency should arise that warrants terminating the unloading operation.

The remote control mechanism 106 includes a rope or the like 108 secured at one end 110 to an intermediate portion, generally indicated as numeral 112, of the control cable 92 and being of a length capable of reaching to the operator at the desired location remote from the wagon 10 and a pair of guide tabs 114,116 each of which are bolted, welded or otherwise fixedly mounted and secured to the right longitudinally extending rail 14 of the chassis 12 respectively adjacent one of the opposing ends 118,120 of the intermeidate portion 112 of the control cable 92 and each of which having an aperture 122 through which runs the control cable 92.

Preferably, enough slack is provided in the control cable 92 in order to form a loop 124 in the cable 92 in the intermediate portion 112 thereof which loop 124 is made permanent by fastening a clamp 126 at the location about the loop 124 where the cable 92 crosses itself. Also, preferably, the rope 108 has a releasable latch 128, such as a halter snap, secured on the one end of the rope 108 by which the rope 108 may be releasably secured to the loop 124 in the cable 92 and thereby the operator after completion of the unloading operation, may release the rope 108 from its securement with the loop 124 until the time of its next use so that the rope 108 will not possibly interfere with other operation occurring on the wagon 10 during the loading of bales in the field.

With respect to the guide tabs 114,116, the one of the tabs, that being 114, nearer to the location of the lever 24 confines one end portion, generally indicated as numeral 130, of the control cable 92, respectively extending from the one end 118 of the intermediate portion 112 of the cable 92 toward the one end 94 of the cable 92, to movement in the aforementioned, generally forwardly direction when the rope 108 is pulled in a direction lateral to the forwardly direction of the cable 92 which pulls the intermediate portion 112 in the same lateral direction, as shown in FIG. 1. The other of the tabs, that being 116, nearer to the control rod 88 of the wagon 10 restricts another end portion, generally indicated as numeral 132, of the control cable 92, respectively extending from the other opposing end 120 of the intermediate portion 112 of the cable 92 toward the opposite end 96 of the cable 92, from movement in the aforementioned lateral direction when the rope 108 is pulled in the lateral direction which pulls the intermediate portion 112 of the cable 92 in the same lateral direction and thereby pulls the one end portion 130 of the cable 92 in the generally forwardly direction and moves the lever 24 accordingly.

It should be noted that the aforementioned lateral direction of movement may be at any angle in a wide range of angles to the generally forwardly direction of movement of the cable 92.

It is readily apparent that the lever 24 is moved from its neutral position to its intermediate rear position by pulling the rope and thus the intermediate portion 112 of the cable 92 to their upper broken line position in FIG. 1. When the lever 24 is in such position, the detent 74 in the upper track 64 will engage the pawl tip 46 and thereby the lever 24 will be retained such that the operator need not hold onto the rope for the lever 24 to remain in that position. With the lever 24 in that position, the cross conveyor 22 will be operated to cause unloading of bales one at a time from the second table. Therefore, the operator can assist in storing the bales as they are elevated to the hay mow or bale stack simultaneously as the cross conveyor 22 operates.

It is further readily apparent that the lever 24 is moved to its extreme rear position by pulling the rope and thus the intermediate portion 112 of the cable 92 to their lower broken line position of FIG. 1. The operator must hold the rope in this position for the lever 24 to stay at its extreme rear position in order to operate the rolling rack to advance another tier of bales forwardly to the second table 18. When termination of the operation of the rolling rack is desired, the operator need only to release hold of the rope 108 and the lever 24 will automatically return to its neutral position.

Further, the operation of the cross conveyor 22 may be terminated without thereafter initiating the operation of the rolling rack by pulling the rope 108 and the intermediate portion 112 of the cable 92 to a position between their upper and lower broken line positions of FIG. 1 and then releasing hold of the rope 108 which again will automatically allow the lever 24 to return to its neutral position.

It is obvious to those skilled in the art that the above-described mechanism 106 may be incorporated into a self-propelled type bale wagon having a bale unloading operation as well as the tractor-propelled type bale wagon referred to hereinabove.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred or exemplary embodiment thereof.

Having thus described the invention, what is claimed is:

1. An improved bale wagon of the type which includes a chassis, bed means mounted on said chassis and capable of supporting a plurality of bales, bale unloading means mounted on said chassis and capable of discharging said bales one at a time from said bed means such as discharging said bales into external conveyor means which leads to a remote bale storage location, and actuating means mounted on said chassis, said actuating means including a movable lever capable of being moved between actuating and non-actuating positions which respectively cause said bale unloading means to operate and not operate and a control cable being attached at one end to said lever and at another end to a location on said wagon remote from said lever and capable of being pulled generally in a first direction for moving said lever between its said positions, wherein the improvement comprises:

a remote control mechanism for allowing an operator to control the operation of said bale unloading means at a location remote from said wagon such as said remote bale storage location, said remote control mechanism including a rope or the like being secured at one end to an intermediate portion of said control cable and being of a length capable of reaching to the operator when at said location remote from said wagon, and guide means being secured to said chassis of said wagon adjacent an end of said intermediate portion of said cable being disposed along said cable between said lever and said one end of said rope or the like secured to said cable, and through which movably extends said control cable, said guide means confining an end portion of said cable, which extends from said end of said intermediate cable portion toward said one end of said cable, to movement in said first direction when said rope or the like is pulled in a direction lateral to said first direction of said cable which pulls said intermediate cable portion in substantially the same lateral direction and thereby pulls said one end portion of said cable in said first direction and moves said lever, whereby said operator while at said location remote from said wagon may control the movement of said lever between its said positions and thereby control the operation of said unloading means by pulling on said rope or the like in said lateral direction which causes said intermediate cable portion to be pulled in said lateral direction and thereby pulls said one end portion of said cable in said first direction and moves said lever.

2. An improved bale wagon as recited in claim 1 wherein said rope or the like is capable of being releasably secured to said intermediate cable portion so that said rope or the like may be readily released from its securement thereto after said bale unloading operation has been completed.

3. An improved bale wagon as recited in claim 1 wherein:
   said intermediate cable portion has a loop formed therein; and
   said rope or the like is attached to said loop.

4. An improved bale wagon as recited in claim 3 wherein said rope or the like includes a releasable latch means attached to said one end of said rope or the like and capable of being releasably secured to said loop so that said rope or the like may be readily released from its securement thereto after said bale unloading operation has been completed.

5. An improved bale wagon of the type which includes a chassis, bed means mounted on said chassis and capable of supporting a plurality of bales, bale unloading means mounted on said chassis and capable of discharging said bales one at a time from said bed means such as discharging said bales into external conveyor means which leads to a remote bale storage location, and actuating means mounted on said chassis, said actuating means including a movable lever capable of being moved between actuating and non-actuating positions which respectively cause said bale unloading means to operate and not operate and a control cable being attached at one end to said lever and at another end to a location on said wagon remote from said lever and capable of being pulled generally in a first direction for moving said lever between its said positions, wherein the improvement comprises:
   a remote control mechanism for allowing an operator to control the operation of said bale unloading means at a location remote from said wagon such as said remote bale storage location, said remote control mechanism including
   a rope or the like being secured at one end to an intermediate portion of said control and being of a length capable of reaching to the operator when at said location remote from said wagon, and
   a pair of guide means each of which being secured to said chassis of said wagon respectively adjacent one of two opposing ends of said intermediate portion of said control cable and through each of which movably extends said control cable, the one of said guide means confining one end portion of said control cable, respectively extending from one of said opposing ends of said intermediate cable portion toward said one end of said cable, to movement in said first direction when said rope or the like is pulled in a direction lateral to said first direction of said cable which pulls said intermediate cable portion in substantially the same lateral direction, the other of said guide means restricting another end portion of said cable, respectively extending from the other one of said opposing ends of said intermediate cable portion toward said another end of said cable, from movement in said lateral direction when said rope or the like is pulled in said lateral direction which pulls said intermediate cable portion in substantially the same lateral direction and thereby pulls said one end portion of said cable in said first direction and moves said lever,
   whereby said operator while at said location remote from said wagon may control the movement of said lever between its said positions and thereby control the operation of said unloading means by pulling on said rope or the like in said lateral direction which causes said intermediate cable portion to be pulled in said lateral direction and thereby pulls said one end portion of said cable in said first direction and moves said lever.

6. An improved bale wagon as recited in claim 5 wherein said rope or the like is capable of being releasably secured to said intermediate cable portion so that said rope or the like may be readily released from its securement thereto after said bale unloading operation has been completed.

7. An improved bale wagon as recited in claim 5, wherein:
   said intermediate cable portion has a loop formed therein; and
   said rope or the like is attached to said loop.

8. An improved bale wagon as recited in claim 7 wherein said rope or the like includes a releasable latch means attached to said one end of said rope or the like and capable of being releasably secured to said loop so that said rope or the like may be readily released from its securement thereto after said bale unloading operation has been completed.

* * * * *